Sept. 3, 1968           P. W. COVERT           3,400,324

HALF-WAVE CONTROL OF FULL-WAVE A.C.

Original Filed July 5, 1962

*INVENTOR.*
PAUL W. COVERT

BY    SHANLEY & O'NEIL

*ATTORNEYS*

United States Patent Office 3,400,324
Patented Sept. 3, 1968

3,400,324
HALF-WAVE CONTROL OF FULL-WAVE A.C.
Paul W. Covert, Valencia, Pa., assignor to Magnetics, Inc., a corporation of Pennsylvania
Continuation of application Ser. No. 207,611, July 5, 1962. This application Apr. 4, 1966, Ser. No. 540,107
1 Claim. (Cl. 323—17)

ABSTRACT OF THE DISCLOSURE

Symmetrical full-wave A.C. power control is achieved utilizing only half-wave control in a circuit embodying alternate current paths between an A.C. source and a load with one current path including a controllable rectifier means and the alternate current path including a saturable reactor. Firing of the saturable reactor means in one-half cycle of the A.C. source is slaved to firing of the controllable rectifier means in its conducting half cycle of the A.C. source. The saturable reactor means includes a core having a high ratio of retentive flux density to saturated flux density, that is a high squareness ratio core. Flux level in the saturable core is reset during each conducting half cycle of, and prior to firing of, the unidirectional conducting means. Slaving of the saturable reactor means results from this setting of the flux level in the saturable core prior to firing of the unidirectional conducting means during its conducting half cycle. The saturable reactor means fires at substantially the same firing angle in its conducting half cycle as firing occurs in the conducting half cycle of the unidirectional conducting means which is under external half-wave control. An impedance can be inserted in the path of certain low impedance controllable rectifier means to match the resistance of that path to that of the saturable reactor.

This application is a continuation of application Ser. No. 207,611, filed July 5, 1962, now abandoned, by Paul W. Covert, and entitled "Control Apparatus."

This invention relates to electrical control apparatus. In one of its more specific aspects the invention relates to symmetrical full-wave A.C. power control.

Full-wave electrical control and power applications often require control of two regulating devices, such as saturable reactors or thyratron devices, from a single control source. Many such applications call for power delivery with symmetrical half-wave configurations, yet are required to operate with only half-wave control or from a single ended control source. Under such conditions the regulating devices, that is the units delivering power to the load in each half cycle, must be made to respond synchronously to a single control signal per full cycle of the power source. In the automatic control field, the circuits and apparatus developed for this purpose have become complicated, cumbersome, and expensive. The teachings of this invention provide simplified method and apparatus for achieving full wave A.C. power control including control in which the average amount of load power in alternate half cycles is delivered in a symmetrical manner.

Figure 1:
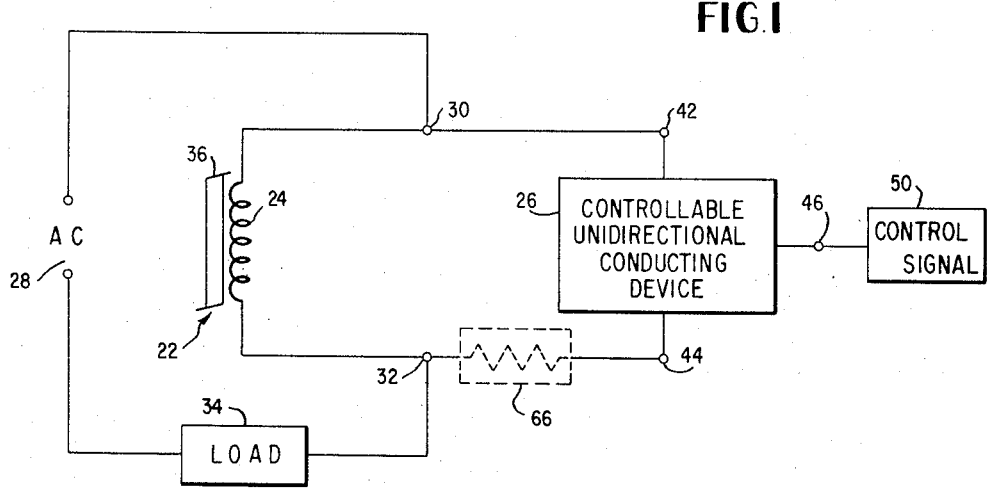
Figure 4:
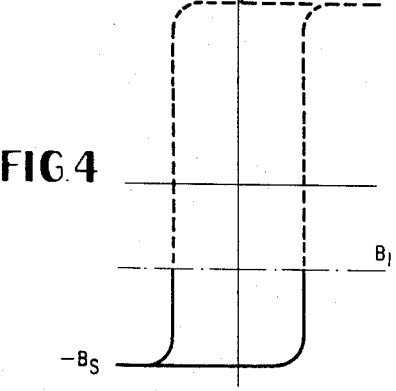
Figure 2:
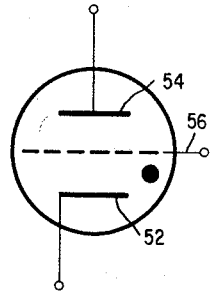
Figure 3:
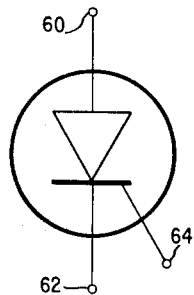
Figure 5:
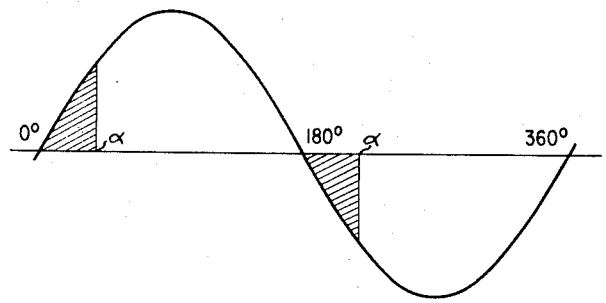

In the drawings:
FIGURE 1 is an electrical schematic circuit diagram embodying the invention;
FIGURES 2 and 3 are schematic diagrams of conventional unidirectional conducting devices;
FIGURE 4 is a representation of the hysteresis loop of a saturable core, and
FIGURE 5 is a representation of the waveform of an A.C. source.

Referring to FIGURE 1, saturable reactor 22, by means of winding 24, is connected in shunt relationship with controllable unidirectional device 26. An A.C. source 28, connected across terminals 30 and 32, provides power for delivery through the shunt paths thus formed to series connected load 34.

The saturable reactor 22 includes a single winding means, the load winding 24, wound on a saturable core 36. In accordance with the teachings of the invention, no control, bias, or other windings are necessary for saturable reactor 22 to perform its desired control function. Therefore the phrase, a saturable reactor with load winding means only, as used herein, refers to a saturable core employing only what is commonly referred to as load windings that is, without bias windings, control windings, or similar windings connected to exert an influence on or be effected by flux in the saturable core. In the art, load windings are also commonly referred to as work windings, gate windings, power windings, and output windings.

The unidirectional conducting device 26 includes main terminals 42 and 44 and a control terminal 46. A control signal source 50 is connected to control terminal 46. Typical examples of suitable unidirectional conducting control devices are shown in FIGURES 2 and 3. FIGURE 2 is a conventional gas filled thyratron having a cathode 52, anode 54, and grid 56. FIGURE 3 is a three terminal, solid state controllable rectifier having main terminals, anode 60 and cathode 62, and a gate terminal 64. Such solid state controllable rectifiers are also referred to as solid state thyratron devices because they exhibit control characteristics similar to a conventional thyratron. Solid state controllable rectifiers, suitable for use in the novel circuit presented herein, are available commercially under the name "silicon controlled rectifier" from such companies as General Electric Company and are described in further detail in "Electronics," Mar. 28, 1958, pages 52 through 55.

In operation, the two regulating devices of FIGURE 1 act as synchronous switches, both being made to respond to a single control signal per full cycle of an A.C. power source. To accomplish this, the unidirectional conducting device and saturable reactor are connected in parallel relationship such that the saturable rector slaves to the unidirectional conducting device to provide symmetrical half-wave A.C. power control. In describing the operation of the circuit of FIGURE 1 reference will be had to FIGURES 4 and 5, FIGURE 4 represents a hysteresis loop of a core material for saturable reactor 22 and FIGURE 5 represents a full cycle of A.C. source 28. In FIGURE 1, consider terminal 30 to be positive with respect to terminal 32 immediately after the supply voltage passes through zero, that is in the positive going half cycle. Consider device 26 connected to be conductive, if fired, during such positive going cycle and the saturable core 36 of reactor 22 to be at negative saturation level $-B_s$. In the first portion of this half cycle, prior to firing of the unidirectional conducting device 26, the supply voltage will appear across winding 24. As the supply voltage continues during this half cycle, saturable core 36 will progress up its hysteresis loop an amount equal to the voltage-seconds elapsed prior to firing of the device 26. Upon firing of device 26, at some angle α, the saturable reactor winding 24 is effectively shorted out of the circuit and the flux in the saturable core 36 will remain at some level $B_1$. Load voltage will be delivered to the load 34 through unidirectional conducting device 26 during the remainder of the half cycle. During the alternate half cycle, device 26 is non-conductive. Supply voltage will appear across saturable reactor 22 driving the flux level in saturable core 36 from its preset level $B_1$ toward negative $B_s$. Since an equal number of volt-seconds is required to return the flux level in the core to negative $B_s$ as drove it in the opposite direction to $B_1$, the core will saturate at the same angle α in the negative half cycle as the device 26 fired in the previous half cycle. With negative saturation of the core 36, reactor 22 fires and load voltage is delivered to load 34 symmetrical with the load voltage delivered by device 26 in the positive half cycle. The cycle will be repeated whenever a control signal is fed to device 26 which fires the device.

From the above description it can be readily seen how half-wave (half cycle) control, one pulse per full cycle of an A.C. source, can be used for full wave control. Since there is only one set of signal input terminals, the signal mixing problems sometimes present in conventional full-wave control apparatus are avoided. The saturable reactor inherently provides high voltage protection for the thyratron device with resulting economies in selection of components and operation of the combination, for example the natural capacitance of the core, along with its losses, provides protection at the higher frequencies against sharp line voltage transients. Also, as will be obvious, the saturable reactor can be used as an autotransformer to reduce voltage across the thyratron device. Further, the saturable core material need not be of the high gain variety but need only have a high ratio of $B_r$ to $B_s$, i.e., a high ratio of retentive flux density to saturated flux density. Such cores are referred to as having a high squareness ratio or good rectangularity. The saturable reactor need have no control windings, bias windings, etc., therefore it many be of simpler construction, and can use its fullest power handling capabilities. The economies in manufacture of an amplifier in accordance with the present invention over the conventional magnetic amplifiers which require control and other windings, low reverse leakage rectifying devices, etc., are obvious.

The present invention is not limited to the controllable rectifiers shown in FIGURES 3 and 4. Controllable unidirectional conducting device or controllable rectifier device as used herein refers to any unidirectional conducting device having thyratron characteristics.

In the circuit of FIGURE 2 there may be some direct current present in load 34 due to the lower (conducting) resistance of certain types of unidirectional conducting devices with respect to saturable reactor 22. This can be minimized by inserting a small impedance, such as resistance 66, in the shunt path of the unidirectional conducting device 26. Resistor 66 is selected to match the D.C. resistance of the saturable reactor 22 in the saturated condition.

Applications of the invention in the control field are numerous and will be obvious to those being skilled in the art. Also many changes and substitutions of equivalents in the disclosed circuitry may be made by those having skill in the art without departing from the spirit of the invention. Therefore, for purposes of determining the scope of the invention reference shall be had to the accompanying claim.

I claim:
1. Apparatus for providing control of full-wave power comprising
controllable rectifier means having anode terminal means, cathode terminal means, and gating terminal means,
saturable reactor means consisting of a saturable core having a high ratio of retentive flux density to saturated flux density and load winding means,
means for connecting the anode terminal means and cathode terminal means across the load winding means of the saturable reactor to form alternate current paths between an A.C. source and a load means,
resistance means connected in series with the controllable rectifier means to substantially balance conductive resistances of the alternate current paths, and
control signal means connected to the gating terminal means of the controllable rectifier means.

References Cited
UNITED STATES PATENTS

| | | | |
|---|---|---|---|
| 2,886,658 | 5/1959 | Spencer | 323—56 |
| 2,054,496 | 9/1936 | Craig | 323—86 |
| 3,018,383 | 1/1962 | Ellart | 307—88.5 |
| 3,136,941 | 6/1964 | Marlow | 323—89 |

OTHER REFERENCES

Glasberg: "Silicon Controlled Rectifiers," Electromechanical Design, vol. 6, No. 3, March 1962 (pages 19 and 23 relied on).

MILTON O. HIRSHFIELD, *Primary Examiner.*

WARREN E. RAY, *Assistant Examiner.*